United States Patent [19]
Carter et al.

[11] Patent Number: 5,771,094
[45] Date of Patent: Jun. 23, 1998

[54] FILM MEASUREMENT SYSTEM WITH IMPROVED CALIBRATION

[75] Inventors: Joseph Carter, San Jose; Jenmming Chen, Campbell; Xing Chen, San Jose, all of Calif.

[73] Assignee: Kla-Tencor Corporation, San Jose, Calif.

[21] Appl. No.: 790,090

[22] Filed: Jan. 29, 1997

[51] Int. Cl.$^6$ .................. G01J 3/36; G01N 21/21
[52] U.S. Cl. .................. 356/326; 356/328; 356/369
[58] Field of Search .................. 356/326, 328, 356/369

[56] References Cited

U.S. PATENT DOCUMENTS

| | | | |
|---|---|---|---|
| 4,430,000 | 2/1984 | Eldering et al. | 356/236 |
| 4,681,444 | 7/1987 | Ferber et al. | 356/318 |
| 5,489,980 | 2/1996 | Anthony | 356/308 |

*Primary Examiner*—Vincent P. McGraw
*Attorney, Agent, or Firm*—Majestic, Parsons, Siebert & Hsue

[57] ABSTRACT

The pixel position-to-wavelength calibration function of film measurement devices such as spectroscopic ellipsometers and spectroreflectometers may shift due to temperature and humidity changes and mechanical factors. One or more wavelength markers provided by the light source or reference sample may be used to correct the calibration function. The pixel positions of one or more persistent wavelength markers are noted during the calibration process and the current positions of such markers are again noted to account for shifts due to various factors to correct the calibration function.

25 Claims, 3 Drawing Sheets

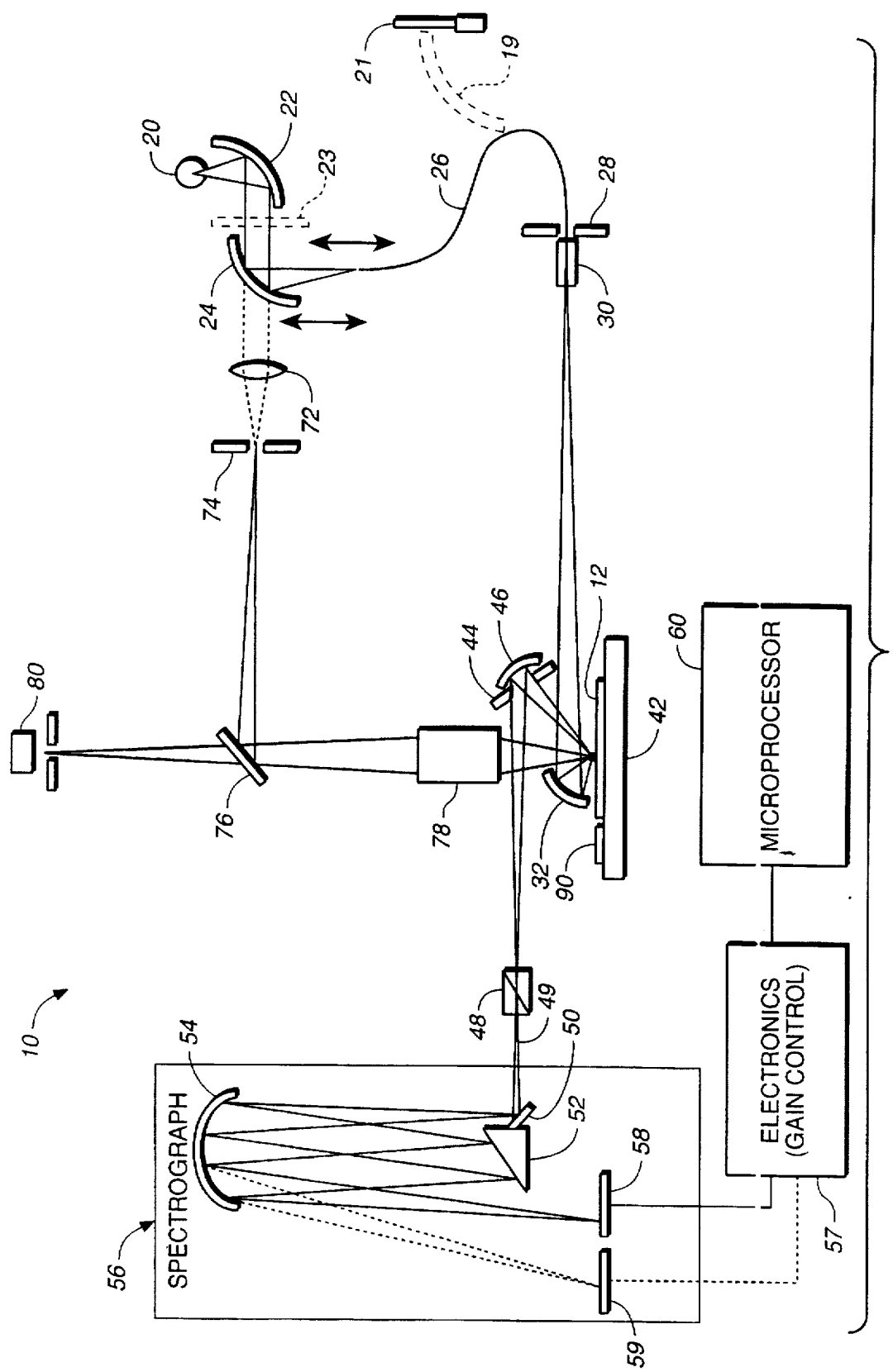

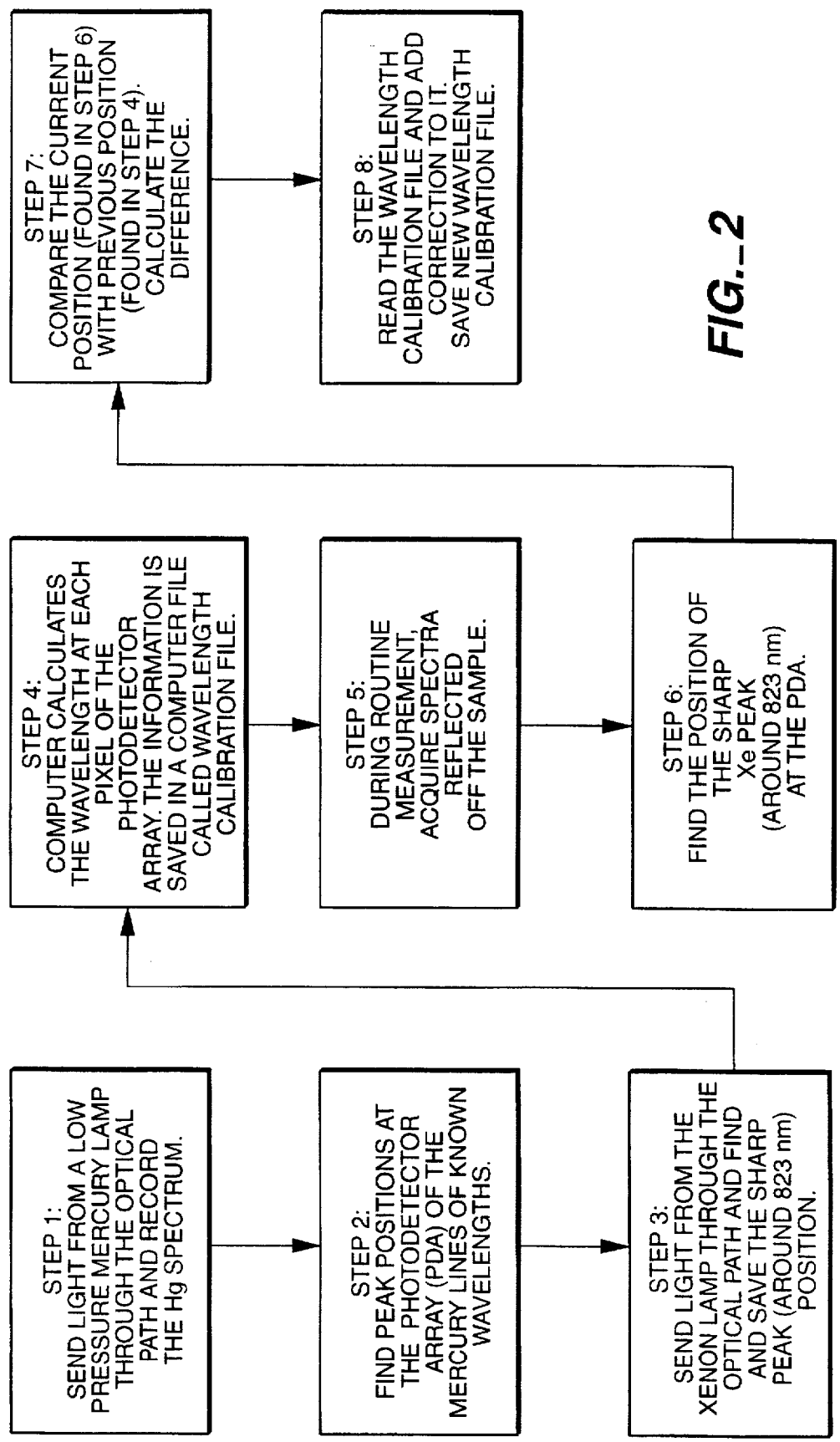
FIG._2

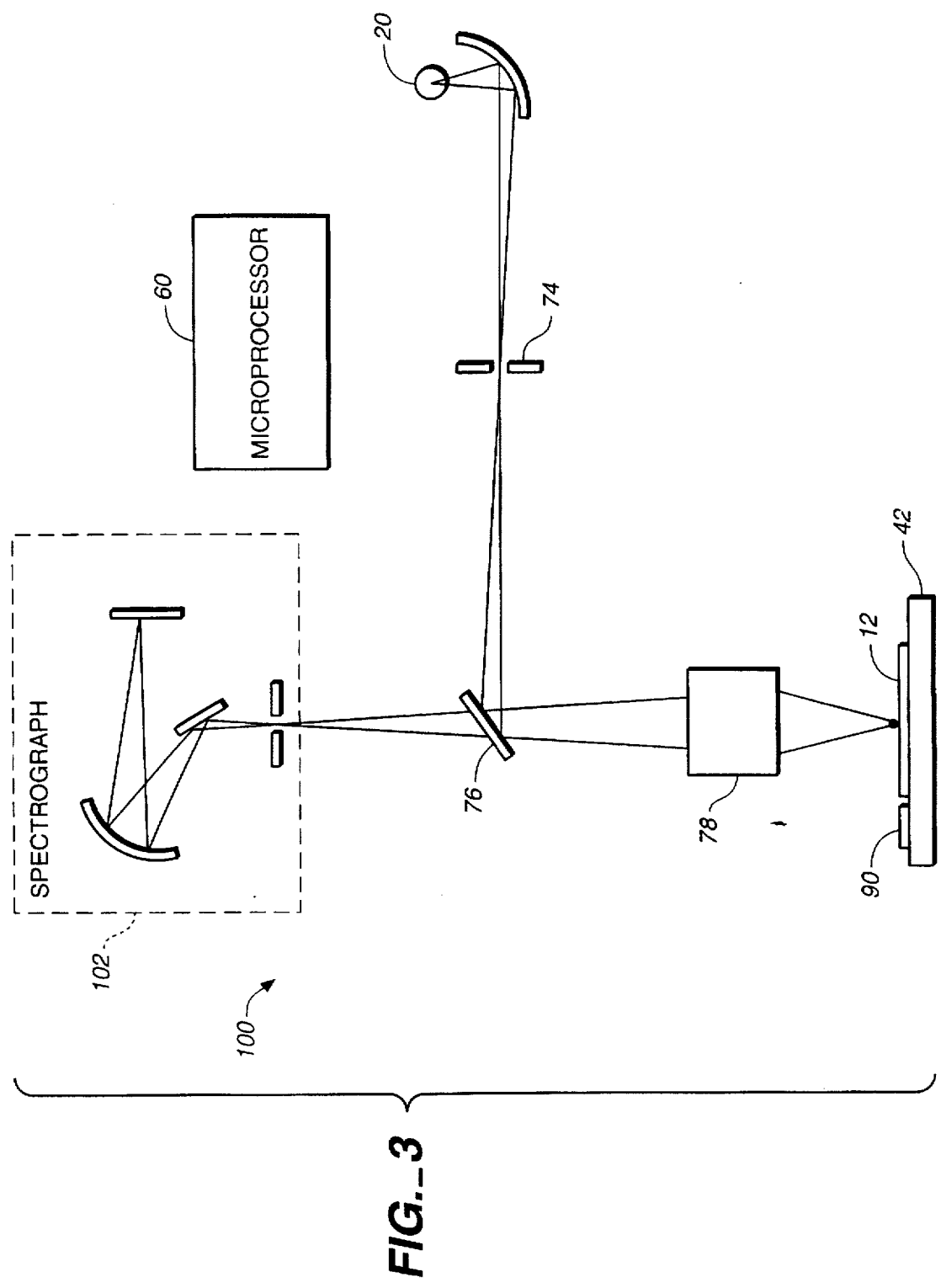
FIG._3

FILM MEASUREMENT SYSTEM WITH IMPROVED CALIBRATION

BACKGROUND OF THE INVENTION

This application relates in general to film measurement systems with spectrometers and, in particular, to a spectroscopic film measurement system with improved wavelength calibration characteristics.

Film measurement systems employing a spectrometer are usually calibrated at system installation and when system components are replaced during service. This calibration typically uses a light source having many spectral lines of known wavelengths, such as a mercury lamp or laser. By fitting the pixel positions of these spectral lines to their wavelengths as calibration reference, the relationship or calibration function between each pixel on a multi-pixel detector array and a corresponding wavelength value can be determined. After such calibration, by detecting the pixel position at the detector array of an unknown wavelength and checking the pixel position against the calibration, the value of the wavelength can be ascertained.

The above described calibration procedure can also employ a narrow band wavelength filter ("laser line filter") of known wavelength value to provide an additional wavelength standard. The narrow band filter can also be used in conjunction with a radiation source with consistent spectral lines as the calibration point in the portion of the radiation source spectrum where there are no strong spectral lines, such as the flat portion of a mercury spectrum.

Between calibrations, many factors can introduce small changes or shifts in the pixel positions of the wavelengths to be detected on the detector. Small changes in the mechanical position of various components in the illumination or detection system due to temperature, humidity, vibration or mechanical relaxation can alter the pixel positions on the multipixel detector array of different spectral components of the radiation to be detected. Changes in temperature or humidity may cause changes in the properties of various optical elements, such as the indices of refraction of such elements. This, in turn, may cause a shift in the pixel positions of the spectral components on the detector array. Changes in the position of the sample due either to mechanical drift or focus position of the optics can also shift pixel positions of the spectral components.

The small shifts described above introduce a wavelength error that propagates through the regression process that is used for determining the thickness(es) or optical properties of the film or films under investigation. The elimination of these errors will allow the users of the tool to improve the process under measurement and the end product of the process. It is, therefore, desirable to provide a system for reducing or minimizing the above-described spectrum shift relative to the detector array.

SUMMARY OF THE INVENTION

This invention is based on the observation that if the calibration can be corrected during the measurement process of the thin film either as a part of the measurement process itself or conveniently using a reference sample, the above-described errors caused by spectrum shift relative to the detector array can be reduced or minimized.

Thus one aspect of the invention is directed to a method for measuring one or more films of a sample, comprising the steps of directing a beam of broadband radiation towards the sample such that radiation from the beam modified by the sample includes at least one persistent wavelength marker; and detecting intensity of radiation of spectral components from the beam that is modified by the sample to measure the one or more films at a plurality of wavelengths in the broadband simultaneously by means of a first detector array of multiple pixels. The array has been calibrated with respect to a calibration function and has a prior pixel position of the marker associated with the calibration function. The method further comprises determining a current pixel position of the at least one persistent wavelength marker from the beam that is modified by the sample; and correcting said calibration by reference to said prior and current pixel positions of the at least one persistent wavelength marker.

Another aspect of the invention is directed a method for measuring one or more films of a sample, comprising the steps of directing a first beam of radiation towards a reference sample, said reference sample being such that radiation from the beam modified by the reference sample includes at least one persistent wavelength marker; and determining a current pixel position of said marker at a detector array of multiple pixels and a difference between the current and a prior pixel position of said marker at said detector array. The method also includes correcting a pixel position-to-wavelength calibration of said detector array by reference to said difference; directing a second beam of broadband radiation towards the sample; detecting radiation from the second beam that is modified by the sample; and providing a measurement of the one or more films at a plurality of wavelengths in the broadband simultaneously by means of the detector array of multiple pixels and in reference to the corrected calibration.

One more aspect of the invention is directed to an apparatus for measuring one or more films of a sample, comprising means for directing a beam of broadband radiation towards the sample such that radiation from the beam modified by the sample includes at least one persistent wavelength marker; and a first detector array of multiple pixels detecting radiation from the beam that is modified by the sample to measure the one or more films at a plurality of wavelengths in the broadband simultaneously. The array has been calibrated with respect to a calibration function and has a prior pixel position of the marker associated with the calibration function. The apparatus further includes means for determining a current pixel position of the at least one persistent wavelength marker from the beam that is modified by the sample; and means for correcting said calibration by reference to said prior and current pixel positions of the at least one persistent wavelength marker.

Yet another aspect of the invention is directed to an apparatus for measuring one or more films of a sample, comprising a reference sample; means for directing a beam of radiation towards the reference sample, said reference sample being such that radiation from the beam modified by the reference sample includes at least one persistent wavelength marker; means for determining a current pixel position of said marker and means for correcting a pixel position-to-wavelength calibration of a detector array of multiple pixels by reference to the current pixel position and a prior pixel position of said marker at the detector array. The apparatus further includes means for directing a beam of radiation towards the sample, said beam including broadband radiation, wherein the detector array of multiple pixels detects radiation from the beam that is modified by the sample; and means for providing a measurement of the one or more films at a plurality of wavelengths in the broadband simultaneously by reference to the corrected calibration.

BRIEF DESCRIPTION OF THE DRAWINGS

FIG. 1 is a schematic diagram of a spectroscopic ellipsometer for illustrating the preferred embodiment of one application of the invention.

FIG. 2 is a block diagram of a flow chart for illustrating the embodiments in FIGS. 1 and 3.

FIG. 3 is a schematic diagram of a spectroreflectometer to illustrate the preferred embodiment of another application of the invention.

For simplicity of description, identical components are identified by the same numerals in the figures.

DETAILED DESCRIPTION OF THE PREFERRED EMBODIMENTS

FIG. 1 is a schematic view of a spectroscopic ellipsometer for illustrating the preferred embodiments of the invention. The spectroscopic ellipsometer 10 is for measuring the thicknesses and optical properties (indices of refraction) of one or more thin films of a sample 12. Ellipsometer 10 includes a xenon lamp 20 for illuminating the sample. As shown in FIG. 1, the light from the xenon lamp is reflected by a mirror 22 and a sliding mirror 24 towards an optical fiber 26. Light emerging from optical fiber 26 is passed through a slit 28 and a polarizer 30 and is focused by a focus mirror 32 towards the sample 12. Light from such beam reflected by the sample is collected by a collection mirror 46 through an aperture in a slit 44 and focused to and through an analyzer 48 as beam 49 to a fold mirror 50 which reflects such light towards another mirror 54. Mirror 54 reflects the beam towards a dispersion prism 52 in spectrograph 56 which disperses the radiation in accordance with the wavelengths of the spectral components in beam 49. Such dispersed spectral components are focused again by mirror 54 towards a photodetector array 58. Array 58 provides outputs to microprocessor 60 which records the pixel positions of the spectral components in the collected reflected beam 49.

The photodetector array 58 is a multiple pixel detector array capable of simultaneously detecting the intensities of a plurality of different spectral components at different wavelengths in a broadband from beam 49 which have been dispersed by prism 52. Examples of detectors that can be used in array 58 include photodiodes and charged coupled devices. Photodetector array 58 has been calibrated upon installation of system 10 where the calibration provides wavelengths as a function of the pixel positions of spectral components detected by the array 58. Thus, by detecting the pixel position of any spectral component in beam 49, the wavelength of such spectral component can be determined by means of microprocessor 60 by reference to the calibration function that is stored in a memory (not shown) in the microprocessor. In this manner, the wavelengths of the different spectral components within beam 49 can be determined.

For accuracy of measurement, it is important to control the vertical height of sample 12. For this purpose, the sliding mirror 24 may be slid out of the way so that the light from xenon lamp 20 is collimated by mirror 22 towards a lens 72 which focuses the beam through a pinhole 74 towards a mirror 76. Mirror 76 reflects the beam towards sample 12 through a microscope objective 78. The light reflected by sample 12 is collected by the objective through mirror 76 to focus sensor 80. The output of sensor 80 is then used to control the vertical height by means of a Z stage (not shown) so that sample 12 is maintained at a proper height relative to the illumination and collection optics in FIG. 1 described above.

As noted above, various factors may cause the pixel positions of the different spectral components in the beam to be shifted by a small amount where the shift would introduce a wavelength error when the pixel position-to-wavelength calibration stored in microprocessor 60 upon installation is used for detecting wavelengths of the spectral components of beam 49. This invention is based on the observation that by correcting the calibration for errors caused by such shifts, the accuracy of film measurement can be improved.

The spectrum of xenon includes a persistent spectral line at a wavelength of about 823 nanometers. Such spectral line does not change as a function of temperature, humidity or other mechanical or optical factors. If the pixel position on photodetector array 58 of such spectral line of xenon is noted during the initial calibration process during system installation or service and such pixel position is recorded together with a calibration function in microprocessor 60, then such pixel position may be used as a reference for correcting the calibration function. When xenon lamp 20 is used for illuminating the sample 12 and if the sample also reflects the spectral component at about 823 nanometers, then the reflected beam 49 also includes such spectral component.

Such persistent spectral line at wavelength of 832 nanometers of a xenon lamp has the same optical path as the other broadband radiation from the xenon lamp passing between slit 28 and array 58 and thus will be shifted by the same amount as the other spectral components that are reflected by sample 12. Such shift in position of the persistent spectral line at wavelength 832 nanometers at array 58 relative to the prior position of the wavelength upon system installation of service may be found by measuring the current pixel position of such spectral line while also simultaneously recording the pixel positions of the other spectral components in beam 49. Thus, if the pixel position of the 823 nanometer wavelength spectral line of xenon has been shifted by a fraction of a pixel, for example, microprocessor 60 may be used to correct the pixel position-to-wavelength calibration of the other spectral components in beam 49 by the same amount to reduce or minimize the errors of the shifts due the various factors.

The complete process for calibration and calibration correction will now be described in reference to FIGS. 1 and 2. In step 1, upon system installation or service, the spectrograph 56 in spectroscopic ellipsometer 10 is calibrated using a low pressure mercury lamp 21 which may be coupled to slit 28 by an optical fiber 19 to illuminate a calibration sample made of reflective material such as aluminum. A low pressure mercury lamp has eight distinct persistent spectral lines. When reflection of the spectral components at these eight wavelengths from the calibration sample reaches the photodetector array 58, the pixel positions of these eight spectral lines are noted. This process is performed as steps 1 and 2 in FIG. 2. The mercury lamp is then turned off and xenon lamp 20 is turned on; the pixel position of the about 823 nanometer spectral line of xenon at array 58 is also noted in step 3 of FIG. 2. In step 4, the microprocessor 60 then calculates the wavelength at each pixel of the photodetector array, using the eight spectral lines of mercury and the about 823 nanometer line of xenon as references. In other words, the microprocessor 60 develops a pixel position-to-wavelength calibration function that would fit the data given by the pixel positions of the eight spectral lines and the 823 nanometer line of mercury and xenon respectively. Such function is then stored in a computer file or wavelength calibration file.

The 823 spectral line of xenon serves as a marker on the photodetector array for calibration correction. Where only one marker is used, it may be preferable to employ a linear correction function by simply shifting the pixel values in the stored calibration function in microprocessor 60 by the same amount that the marker has been shifted between the prior and current pixel positions. Where more than one persistent wavelength markers are used, a linear or non-linear correction function may be desirable to fit the data, depending on the source of the errors due to the above-described factors. It may be preferable to create correction functions that achieve subpixel accuracy in determining the prior and current pixel positions of the marker and hence of the difference or shift between the two positions, as well as in corrections of pixel values in the calibration function.

When the sample 12 is then measured in step 5 of FIG. 2, the spectra reflected by sample 12 is then acquired and the pixel positions of the different spectral components at photodetector array 58 are recorded. The current pixel position of the about 823 nanometer wavelength spectral line of xenon at the array is also recorded in step 6 of FIG. 2. As indicated above, various factors may have caused shifts in the pixel positions of spectral components in the broadband to be measured. However, since the 823 nanometer spectral component of xenon has passed through the same optical path as the other spectral components of beam 49, the shift in pixel position of the 823 nanometer line can be used to correct the calibration. Thus in step 7, the current position of the about 823 nanometer spectral line of xenon is compared by microprocessor 60 to the prior position of such line recorded and stored in microprocessor 60 and the difference is calculated. Then in step 8, the microprocessor reads the wavelength calibration function from the calibration file and corrects the calibration function to provide a new corrected wavelength calibration file which is then stored. This corrected calibration function is then used to ascertain the wavelengths of the different spectral components in beam 49. Correction of the calibration function may be carried out prior to or after detection of the spectral components in beam 49 by array 58.

The persistent wavelength marker described above for calibration correction may be provided in a number of ways. The about 823 nanometer spectral component of xenon is one particular marker that may be used. To serve as a marker, it must be distinct and identifiable over and above the other spectral components of the radiation source or other optical signals at array 58.

One type of marker that may used are atomic emission spectral lines. If such spectral lines are emitted by the same source that emits broadband radiation useful for film measurement, as in the case of a xenon lamp, a single source will be adequate for providing the broadband radiation for measurement as well as the marker. Other sources that can provide both the broadband radiation and one or more markers include the mercury lamp or a broadband source supplying broadband radiation through a notch filter. In other configurations, the marker and the broadband radiation may be provided by different sources where separate optical paths may be used to direct a marker and the broadband radiation separately to a slit 28, in the same way that optical fibers 26 and 19 are used to direct light from separate sources 20 and 21 to slit 28 shown in FIG. 1.

Yet another possible configuration is to employ a narrow pass band filter 23 that may be moved in and out of the optical path between mirrors 22 and 24. When the narrow pass band filter 23 is in the optical path, only a sharp spectral component of the broadband is passed through the filter 23 to serve as the marker. When filter 23 is removed from the optical path, broadband radiation from source 20 is supplied to illuminate sample 12.

Instead of employing light sources that have persistent wavelength markers, it is also possible to take advantage of any persistent wavelength markers that may be present in light reflected by the sample 12.

Thus, if sample 12 provides persistent wavelength absorption or fluorescence peaks or valleys or interference patterns, these peaks or valleys or patterns may also be used as wavelength markers for correcting the calibration.

Instead of using a single or composite light source to provide the wavelength marker, a reference sample 90 may be used instead. As shown in FIG. 1, sample 12 and a reference sample 90 are placed on X-Y sample stage 42 which holds the sample 12 and the reference sample. Prior or subsequent to the measurement of sample 12, X-Y stage 42 would cause a horizontal movement so that the reference sample 90 is placed in the position of sample 12 in FIG. 1 to provide a measurement for correcting the calibration. Thus, the reference sample 90 may provide an absorption or a fluorescence peak or valley or interference pattern that can be used as a marker for correcting the calibration. In order for the correction to be accurate and effective, the prior reference pixel position of the absorption or fluorescence peaks or valleys or interference patterns of the reference sample 90 must first be found during an initial calibration of the photodetector array 58. Such pixel position or positions and the calibration function are stored by microprocessor 60. Then prior or subsequent to performing an actual measurement on sample 12, the same measurement is performed on reference sample 90 to detect the current position of the absorption or fluorescence peak or valley or interference pattern at array 58. The difference between the prior and current positions of the peak or valley is used to correct the calibration in the same manner as that described above by reference to FIG. 2. After the calibration has been so corrected, the corrected calibration is then used to identify the wavelengths of the spectral components in beam 49 by means of their pixel positions.

In reference to FIG. 2, if a reference sample is used instead to provide the wavelength marker, steps 3 and 6 of FIG. 2 would need to be modified. Thus in step 3, instead of using the wavelength marker from the light source to find a sharp peak or valley position, a reference sample is used during the calibration process to find the absorption or fluorescence peak or valley position or interference pattern relative to the calibration function calculated in step 4 and both are stored by the microprocessor. In step 6, instead of finding the position of the sharp peak or valley provided by the light source, the reference sample is placed in position for measurement of the current position of the absorption or fluorescence peak or valley or interference pattern. The difference in positions are then calculated as before in step 7 as the basis for the calibration correction.

While the wavelength marker provided by a reference sample is just as effective as that provided by the light source, such approach does not account for shifts due to error in sample position or tilt of the sample. Nevertheless, the use of the reference sample may be advantageous in some applications and also when the marker provided by the light source becomes costly to provide.

While the invention has been described as applicable to spectroscopic ellipsometers where mirror 32 directs the beam at an oblique angle to a surface of the sample, it is also applicable to spectroreflectometers as well. As in the case of spectroreflectometers where the illuminating beam is normal to the sample surface, the xenon lamp 22 in spectroreflectometer 100 of FIG. 3 may be used to provide the wavelength marker. The process described in reference to FIG. 2 may then be used to correct the calibration of the photodetector array 58 in spectrometer 102 of the spectroreflectometer. Alternatively, a reference sample 90 may be used instead where a procedure essentially similar to that described above for spectroscopic ellipsometers may be used to correct the calibration. Spectrometer 102 may have components substantially similar to those in spectrograph 56 of FIG. 1. Integration time control (not shown) may also be provided for spectroreflectometer 100 in the same manner as described above for spectroscopic ellipsometer 10.

In the above description, a single detector array 58 is used for detecting both the spectral components in the broadband useful for thin film measurement as well as the wavelength marker. It will be understood, however, that this is not required and that separate detectors may be used for detecting the spectral components from the broadband radiation and the marker. In reference to FIG. 1, detector array 59 may be used for detecting the marker while detector array 58 is still used for detecting the spectral components of the broadband. This may be advantageous for some applications where the marker is in a different wavelength range compared to the spectral components in the broadband used for film measurement. In such event, prism 52 will disperse the marker at a different angle to reach detector 59 while prism 52 disperses the spectral components in the broadband towards detector array 58 after reflection from mirror 54. Array 59 may be much shorter than array 58 since array 59 is employed to detect within a narrow wavelength range. Furthermore, each of the two detector arrays may be optimized (e.g. optimized gain) for detecting respectively the marker and the spectral components in the broadband. This is particularly advantageous where the marker has a much higher or lower intensity compared to the spectrum components in the broadband. The gains of the detectors in the two arrays 58, 59 may be controlled by gain control electronics 57 to avoid saturation. Gain control may be implemented simply by changing the integration time for photodetector array or charge coupled devices.

The marker need not be present during the entire measurement time but could be "flashed" or modulated to minimize the effect on the detected spectral components in the broadband, as in the case where filter 23 is used as described above. In the embodiments above, only light reflected from the sample 12 is detected for film measurement. The invention is equally applicable to film measurements where the sample transmits radiation. In such event, radiation transmitted through the sample is directed to the spectrograph 56 or 102 for identifying the wavelengths of the spectral components of the transmitted radiation, which operates in a manner similar to a polarimeter. In general, light reflected, transmitted or otherwise modified by the sample may be directed to the spectrographs for similar analysis and film measurement. Where a reference sample is used for calibration correction, then radiation modified (e.g. transmitted or scattered) by the reference sample is used for marking the detector array and for calibration correction. The radiation provided towards the reference sample need not have a broadband since only the spectral components at or near the wavelength of the marker are used for calibration correction.

While the invention has been described by reference to various embodiments, it will be understood that various changes and modifications may be made without departing from the scope of the invention which is to be defined only by the appended claims and their equivalents. Thus, while xenon or mercury lamps are described herein, it will be understood that other radiation sources may be used, such as other sources providing electromagnetic radiation in the visible, infrared and/or ultraviolet range or even radiation of wavelengths outside such ranges.

Attached hereto as a part of this application is Appendix A entitled "Computer Codes for Dynamic Wavelength Calibration Written in C++". The computer codes illustrate some of the steps of FIG. 2. A comment referring to a particular step in FIG. 2 is inserted before each portion of the computer codes that are used to implement such step in FIG. 2.

APPENDIX A

Computer Codes for Dynamic Wavelength Calibration Written in C++

*Comment: Step 1- Acquire the spectrum of the low pressure mercury lamp*

```
BOOL CWaveCalView::AcquireDataAndFindPeaks()
{
    if(m_bReadFromFile)
        return(ReadSpectrumFromFile());
    else
    {
        // step 1, get spectrum
        BOOL bCmdOK = GetData();
        // step 2, calculate standard deviations
        if(bCmdOK == TRUE)
        {
            ExtractIntensity(m_nSumNumber);   // find average spectrum
            FindAllMercuryPeaks();
        }
        return bCmdOK;
    }
}
```

*Comment: Step 2-Find the positions of the peaks in the mercury lamp spectrum.*

```
void CWaveCalView::FindAllMercuryPeaks()
{
    // find peak pixels and curve-fit peaks
    for (int i=0; i < NUM_OF_PIXELS; i++)
        m_pfFittedSpectrum[i] = m_pfAvgIntensity[i] - 1.0f;   // pre-set fitted curve first for (i=0; i < 8; i++)
```

Xepatdwg.doc

- 1 -

```
        UINT uPeakPixel;
        // find peak within seed pixel number
        int nSeed = (int)m_pfPixelVsWaveLength[i][1];
        int nSearchRange = (int)m_uSearchRange;
        if(i == 0)
        {
                // requested by John F. to have wider search range for first peak
                nSearchRange += (int)m_uSearchRange;
        }
        else
        {
                // use relative seed value (= peak_seed[i] +(peak_found[i-1] - peak_seed[i-1])
                int nTemp = (int)(m_pfPixelVsWaveLength[i-1][2] - m_pfPixelVsWaveLength[i-1][1]);
                // max/min of 5 pixels corrections
                if(nTemp > 10)
                        nTemp = 10;
                else if(nTemp < -10)
                        nTemp = -10;

nSeed += nTemp;
        }
        m_pMathWaveCal->FindPeak(nSeed, nSearchRange,NUM_OF_PIXELS,
                        m_pfAvgIntensity, &uPeakPixel);          // find peak within seed pixel number
        // save peak intensity
        m_pfPixelVsWaveLength[i][4] = m_pfAvgIntensity[uPeakPixel];
        // curve-fit peak to get better result
        m_pfPixelVsWaveLength[i][2] = m_pMathWaveCal->CurveFitPeak(i, (int)uPeakPixel,
                (int)m_uCurveFitRange, m_uPeakFitAlgorithm, m_pfAvgIntensity, m_pfFittedSpectrum);

// also find Reflection Index
        m_dbRISquare[i] = m_pMathWaveCal->CalculateRISquare(m_pfPixelVsWaveLength[i][0]);
}
// also find reflection Index for non-mecury peaks, if any
for (i=6; i < MAX_FITTING_SETS; i++)
```

```
        m_dbRISquare[j] = m_pMathWaveCal->CalculateRISquare(m_pfPixel[VsWaveLength[j][0]);

Step 3 -Acquire Xenon peak.

void CWaveCalView::AcquireXePeak(BOOL bRemoveBKNoise)
{
        // find & display 823Peak pixel location
        BOOL bCmdOK = m_pF3Math->GetSESpectrum(pPCIF, m_puData);

if(m_pF3Math->IsIntensityOK(m_puData, FALSE))    // only do it when intensity is good
        {
                float* pfSpectrum = new float[NUM_OF_8SUM_PIXELS];
                for(int j=0; j < NUM_OF_8SUM_PIXELS; j++)
                        pfSpectrum[j] = (float)m_puData[j];

float fPeak = (float)m_n823Seed;          // serve as Seed value
                if(m_pF3Math->FindAvg823Peak(pfSpectrum, fPeak, FALSE))
                {
                        // use averaged number if error is less then 0.1 pixels
                        if((fPeak <(m_f823PeakPos - 0.1f)) || (fPeak >(m_f823PeakPos + 0.1f)))
                                m_f823PeakPos = fPeak;
                        else
                                m_f823PeakPos = (m_f823PeakPos + fPeak) / 2.0f;
                        sprintf(sBuf,"%.3f(%.3f)",m_f823PeakPos, m_f823PeakPos-f823WaveCalPos);
                }
                delete [] pfSpectrum;

SetDlgItemText(IDC_823PEAK, sBuf);
        }
}
```

*Comment :Step 4- Create wavelength calibration table and save it as a file.*

```
void CWaveCalView::CreateWLTable()
{
    // TODO: Add your control notification handler code here
    #if 1
    if(m_bPeakDataReady)
    {
        //CComboBox* pCB = (CComboBox*) GetDlgItem(IDC_DISPLAY_SELECT);
        //ASSERT(pCB != NULL);
        //pCB->SetCurSel(DSP_FOUND_ERR);

m_pMathWaveCal->SetBusyCursor(TRUE);        // set cursor to Hour-glass
            CurveFitPixelVsRI();
            SearchBestWLvsPixels();
        m_pMathWaveCal->SetBusyCursor(FALSE);       // set cursor to normal
            m_bPixelWLReady = TRUE;    //
    }
    #endif
} void CWaveCalView::CurveFitPixelVsRI()
{
    if(m_nWLAlgorithm == FIT_WL_QUAD)
    {
        //
        //      Equ: N = a * RI^2 + b * RI + c
        // See OnClickedAcquireData() for theoretical backgrounds
        //
        double pfX[MAX_FITTING_SETS], pfY[MAX_FITTING_SETS];
        double pfCoefficient[3];
        for(int i=0; i<MAX_FITTING_SETS; i++)
```

```
                        pfY[i] = m_pfPixelVsWaveLength[i][2];              // pixel found
                        pfX[i] = sqrt(m_dbRISquare[i]); // RI of this pixel
                }
                if((m_bExclude8thPeak) && (m_uNumOfWLs >= 8))
                {
                        // don't use the last peak
                        pfY[7] = m_pfPixelVsWaveLength[PEAK9_INDEX][2];    // pixel found
                        pfX[7] = sqrt(m_dbRISquare[PEAK9_INDEX]); // RI of this pixel
                        m_pMathWaveCal->QuadFit((int)m_uNumOfWLs-1, pfX, pfY, pfCoefficient);
                }
                else
                        m_pMathWaveCal->QuadFit((int)m_uNumOfWLs, pfX, pfY, pfCoefficient);

m_pfCoefficient[0] = (float)pfCoefficient[0];
                m_pfCoefficient[1] = (float)pfCoefficient[1];
                m_pfCoefficient[2] = (float)pfCoefficient[2];

ShowCoefficients(3);
        }
        else
        {
                // fit WLvsRI into Cubic equ
                //
                //          Equ: N = a * RI^3 + b * RI^2 + c * RI + d
                //
                CCurveFit CurveFit;
                double pfX[MAX_FITTING_SETS], pfY[MAX_FITTING_SETS], pfWeight[MAX_FITTING_SETS];
                #if 1
                //for(int i=1; i<MAX_FITTING_SETS; i++)
                for(int i=0; i<MAX_FITTING_SETS; i++)
                {
                        #if 0
```

Xepatdwg.doc

```
                              pfX[i] = 1.4f + i;
                              double fTemp = pfX[i];
                              pfY[i] = -3860.0f + 13051.0f * fTemp - 6921.0f * fTemp * fTemp + 0.002f * fTemp * fTemp * fTemp *
fTemp;
             #else
                              pfY[i] = m_pfPixelVsWaveLength[i][2];          // pixel found
                              pfX[i] = sqrt(m_dbRISquare[i]);// RI of this pixel
                              pfWeight[i] = 1.0f;                // ie no weighting
             #endif
             }
             double pdbCoeff[5];
             int nResult;
             if(m_nWLAlgorithm == FIT_WL_CUBIC_MSE)          // MSE fit
                      nResult = CurveFit.FitCubicMinMSE((int)m_uNumOfWLs,pfX, pfY, pfWeight, pdbCoeff);
             else     // MinMax fit (Find the minimum possible "maximum error"
                      nResult = CurveFit.FitCubicMinMax((int)m_uNumOfWLs,pfX, pfY, pfWeight, pdbCoeff);

if(nResult == 0)
             {
                      // error here
                      for(int i=0; i < 4; i++)
                              m_pfCoefficient[i] = 1.0f;
             }
             else
             {
                      for(int i=0; i < 4; i++)
                              m_pfCoefficient[i] = (float)pdbCoeff[i];
             }
             ShowCoefficients(4);
     #endif
     }
     //
     // Upto this point we have the incident Angle which gives us the best fit (or
     // minimum pixels(typically 8 peaks) MSE
```

Xepat/dwg.doc                          - 6 -

```
//
}

BOOL CWaveCalView::CreateWLvsPixels()
{ m_pMathWaveCal->ShowStatus(0, "Searching matching pixels........");

float fBegin = 200.0f;         // begin WL, in nm
    float fEnd = 2000.0f;          // end WL, in nm
    BOOL bCmdOK = TRUE;
    for(int j=0; j<NUM_OF_PIXELS; j++)
    {
        float fFoundWL;
        if(m_pMathWaveCal->SearchBestPixels(j, fBegin, fEnd, m_pfCoefficient, m_nWLAlgorithm, &fFoundWL))
        {
            m_pfFoundPixelVsWL[j] = fFoundWL;
            fBegin = fFoundWL;
        }
        else
        {
            bCmdOK = FALSE;
            break;
        }
    }
    if(bCmdOK)
    {
        FindPixelsErrors();
    }
    else
    {
        // reset the errors
        for(int i=0; i<(int)m_uNumOfWLs; i++)
        {
```

```
        m_pfPixelVsWaveLength[i][3] = 1.0f;
    }
    m_pMathWaveCal->ShowStatus(0, "");
    m_pMathWaveCal->SetBusyCursor(TRUE);   // set cursor to hour-glass
    return bCmdOK;
} void CWaveCalView::OnClickedSave()
{
    // TODO: Add your control notification handler code here
    m_pMathWaveCal->SetBusyCursor(TRUE);   // set cursor to hour-glass
    //
    // Save into system's ini file if so desired
    //
    if(AfxMessageBox("Save Results in system file('c:\\sysdat\\secal\\dataacq.ini')?", MB_YESNO|MB_ICONQUESTION) ==
IDYES)
    {
        char* sFileName = "c:\\sysdat\\secal\\dataacq.ini";

char sBuf[80];
        char sDat[30];
        WritePrivateProfileString("WaveCal", "Equation", "> N = a * RI^2 + b * RI + c", sFileName);

sprintf(sBuf, "%.7f", m_pfCoefficient[2]);
        WritePrivateProfileString("WaveCal", "a", sBuf, sFileName);

sprintf(sBuf, "%.6f", m_pfCoefficient[1]);
        WritePrivateProfileString("WaveCal", "b", sBuf, sFileName);

sprintf(sBuf, "%.6f", m_pfCoefficient[0]);
        WritePrivateProfileString("WaveCal", "c", sBuf, sFileName);

// save 823PeakValue, since this will be used to compare with future spectrum
        // we should save the SeedValue (value found from raw spectrum and not been modified)
        //
```

```
        sprintf(sBuf,"%.3f", m_f823Pos);              // 823nm peak
        WritePrivateProfileString("Wavelength", "823nmPixel", sBuf, sFileName);

WritePrivateProfileString("Wavelength", "Pixels", "512", sFileName);

for(int j=0; j<NUM_OF_PIXELS; j++)
        {
            sprintf(sDest,"W%d",j);
            sprintf(sBuf,"%.3f", m_pfFoundPixelVsWL[j]);
            WritePrivateProfileString("Wavelength", sDest, sBuf, sFileName);
        }

AfxMessageBox("Done!, Coefficients & Spectrum saved", MB_OK|MB_ICONINFORMATION);
    }
    m_pMathWaveCal->SetBusyCursor(FALSE);    // set cursor to normal
}

Comment:    Step 5 & 6-Acquire the sample spectrum which includes the xenon peak.

void CWaveCalView::AcquireXePeak(BOOL bRemoveBKNoise)
{
    // find & display 823Peak pixel location
    BOOL bCmdOK = m_pF3Math->GetSESpectrum(pPCIF, m_puData);

if(m_pF3Math->IsIntensityOK(m_puData, FALSE))    // only do it when intensity is good
    {
        float* pfSpectrum = new float[NUM_OF_8SUM_PIXELS];
        for(int j=0; j<NUM_OF_8SUM_PIXELS; j++)
            pfSpectrum[j] = (float)m_puData[j];

float fPeak = (float)m_n823Seed;    // serve as Seed value
        if(m_pF3Math->FindAvg823Peak(pfSpectrum, fPeak, FALSE))
        {
            // use averaged number, if error is less then 0.1 pixels
```

```
                if((fPeak <(m_f823PeakPos - 0.1f)) || (fPeak >(m_f823PeakPos + 0.1f)))
                        m_f823PeakPos = fPeak;
                else
                        m_f823PeakPos = (m_f823PeakPos + fPeak) /2.0f;
                sprintf(sBuf,"%.3f(%.3f)", m_f823PeakPos, m_f823PeakPos-f823WaveCalPos);

delete [] pfSpectrum;
        }
        SetDlgItemText(IDC_823PEAK, sBuf);
}

Comment: Step 7 & 8--Find the xenon peak shift and apply the correction void CJoystickTestDlg::ApplyCorrection()
{
} void CWaveCalView::AcquireXePeak(BOOL bRemoveBKNoise)
{
        // find & display 823Peak pixel location
        BOOL bCmdOK = m_pF3Math->GetSESpectrum(pFCIF, m_puData);
        if(m_pF3Math->IsIntensityOK(m_puData, FALSE))   // only do it when intensity is good
        {
                float* pfSpectrum = new float[NUM_OF_8SUM_PIXELS];
                for(int j=0; j < NUM_OF_8SUM_PIXELS; j++)
                        pfSpectrum[j] = (float)m_puData[j];

float fPeak = (float)m_n823Seed;;       // serve as Seed value
                if(m_pF3Math->FindAvg823Peak(pfSpectrum, fPeak, FALSE))
                {
                        // use averaged number if error is less then 0.1 pixels
                        if((fPeak <(m_f823PeakPos - 0.1f)) || (fPeak >(m_f823PeakPos + 0.1f)))
                                m_f823PeakPos = fPeak;
                        else
```

```
            m_f823PeakPos = (m_f823PeakPos + fPeak) / 2.0f;
            sprintf(sBuf,"%6.3f(%.3f)",m_f823PeakPos, m_f823PeakPos-f823WaveCalPos);
        }
        delete [] pfSpectrum;
    }
    SetDlgItemText(IDC_823PEAK, sBuf);

// TODO: Add your control notification handler code here
    static BOOL bNoBackupDone = FALSE;
    if(!bNoBackupDone)
    {
        CF3File* f3file = new CF3File();
        ASSERT(f3file);
        f3file->CopyFile("C:\\sysdat\\secal\\dataacq.ini","c:\\temp\\dataacq.ini");
        delete f3file;
        bNoBackupDone = TRUE;
    }

// Get this App
    CF3diagApp* pApp = (CF3diagApp*) AfxGetApp(); // get the App
    ASSERT(pApp != NULL);

//
    // find 823nm Peak shift in pixels
    //
    char sBuf[40];
    char sDest[40];
    float fNew823nmPixel = 0.0f, fOrg823nmPixel;
    GetDlgItemText(IDC_823_NEW, sBuf, 10);
    sscanf(sBuf,"%f",&fNew823nmPixel);

char* sFileName = "c:\\sysdat\\secal\\dataacq.ini";
    GetPrivateProfileString("Wavelength","823nmPixel","0.0", sBuf, sizeof(sBuf), sFileName);

Xepatdwg.doc                          - 11 -
```

```
sscanf(aBuf,"%f",&fOrg823nmPixel);
if(fOrg823nmPixel == 0.0f)
{
    // error Xenon peak must be > 480.0 (typically at 488.0)
    AfxMessageBox("Error!, No original WaveCal info available(Did you use me to do WaveCal?)");
    return;
} float fPixelDiff = fNew823nmPixel - fOrg823nmPixel;
// Set cursor to hourglass
pApp->BeginWaitCursor();
//
// get original WL from f3diag.ini
//
float* pfOrgWL = new float[NUM_OF_PIXELS];
for(int j=0; j<NUM_OF_PIXELS; j++)
{
    sprintf(aDest,"W%d",j);
    GetPrivateProfileString("Wavelength", aDest, "0.0",aBuf, sizeof(aBuf),"f3diag.ini");
    sscanf(aBuf,"%f", &pfOrgWL[j]);
}
//
// write modified WL to system's ini file
//
if((pfOrgWL[0] != 0.0f) && (pfOrgWL[1] != 0.0f))
{
    char* sFileName = "c:\\sysdat\\wecal\\dataacq.ini";
    for(j=0; j<(NUM_OF_PIXELS-1); j++)
    {
        //
        // Eq: WL(i) = WL(j) - (WL(j+1) - WL(j)) * PixelDiff
        //
        float fShouldBe = pfOrgWL[j] - (pfOrgWL[j+1] - pfOrgWL[j]) * fPixelDiff;
        sprintf(aDest,"W%d",j);
```

- 12 -

Xcpatdwg.doc

```
            sprintf(sBuf,"%.3f",fShouldBe );
            WritePrivateProfileString("Wavelength", sDest, sBuf, sFileName);
        }
        // don't forget the last point
        float fShouldBe = pfOrgWL[j] - (pfOrgWL[j] - pfOrgWL[j-1]) * fPixelDiff;
        sprintf(sDest,"W%d",j);
        sprintf(sBuf,"%.3f",fShouldBe );
        WritePrivateProfileString("Wavelength", sDest, sBuf, sFileName);

AfxMessageBox("Done!, Pixel_vs_WaveLength modified");
    }
    else
        AfxMessageBox("Error!, No original WaveCal info available(Did you use me to do WaveCal?)");

pApp->EndWaitCursor();
    delete [] pfOrgWL;
}
```

What is claimed is:

1. A method for measuring one or more films of a sample, comprising the steps of:

directing a beam of broadband radiation towards the sample such that radiation from the beam modified by the sample includes at least one persistent wavelength marker;

detecting intensity of radiation of spectral components from the beam that is modified by the sample to measure the one or more films at a plurality of wavelengths in the broadband simultaneously by means of a first detector array of multiple pixels, said array having been calibrated with respect to a calibration function and having a prior pixel position of the marker associated with the calibration function;

determining a current pixel position of the at least one persistent wavelength marker from the beam that is modified by the sample; and correcting said calibration by reference to said prior and current pixel positions of the at least one persistent wavelength marker.

2. The method of claim 1, said directing step directing a beam of radiation having a persistent wavelength marker.

3. The method of claim 2, said correcting step including creating a linear correction function to correct said calibration.

4. The method of claim 2, said directing step directing a beam of radiation having a plurality of persistent wavelength markers.

5. The method of claim 3, said correcting step comprising creating a linear or non-linear correction function to correct said calibration.

6. The method of claim 2, said directing step directing a beam of radiation from a mercury or xenon lamp, a laser source or through a filter.

7. The method of claim 1, further comprising detecting said marker by means of a second detector array of multiple pixels different from the first detector array of multiple pixels.

8. The method of claim 1, wherein said detecting step detects the radiation reflected from the sample.

9. The method of claim 1, further comprising controlling gains of detectors in the array.

10. The method of claim 1, wherein said current pixel position of the marker is determined to subpixel accuracy, and said calibration is corrected to subpixel accuracy.

11. A method for measuring one or more films of a sample, comprising the steps of:

directing a first beam of radiation towards a reference sample, said reference sample being such that radiation from the beam modified by the reference sample includes at least one persistent wavelength marker;

determining a current pixel position of said marker at a detector array of multiple pixels and a difference between the current and a prior pixel position of said marker at said detector array;

correcting a pixel position-to-wavelength calibration of said detector array by reference to said difference;

directing a second beam of broadband radiation towards the sample;

detecting radiation from the second beam that is modified by the sample; and providing a measurement of the one or more films at a plurality of wavelengths in the broadband simultaneously by means of the detector array of multiple pixels and in reference to the corrected calibration.

12. The method of claim 11, further comprising providing a reference sample having a persistent absorption or fluorescence peak or valley or an interference pattern.

13. The method of claim 11, wherein the determining step includes detecting intensity of radiation directed towards the reference sample after modification by the reference sample.

14. The method of claim 11, said detecting step detecting radiation that is reflected by the sample.

15. An apparatus for measuring one or more films of a sample, comprising:

means for directing a beam of broadband radiation towards the sample such that radiation from the beam modified by the sample includes at least one persistent wavelength marker;

a first detector array of multiple pixels detecting radiation from the beam that is modified by the sample to measure the one or more films at a plurality of wavelengths in the broadband simultaneously, said array having been calibrated with respect to a calibration function and having a prior pixel position of the marker associated with the calibration function;

means for determining a current pixel position of the at least one persistent wavelength marker from the beam that is modified by the sample; and means for correcting said calibration by reference to said prior and current pixel positions of the at least one persistent wavelength marker.

16. The apparatus of claim 15, said directing means including a broadband radiation source having one or more persistent wavelength markers.

17. The apparatus of claim 16, said radiation source including a mercury or xenon lamp, a laser source or a filter.

18. The apparatus of claim 15, said determining means comprising a second detector array of multiple pixels.

19. The apparatus of claim 15, wherein said first detector array detects radiation that is reflected by the sample.

20. The apparatus of claim 15, said apparatus being a spectroscopic ellipsometer or a spectroreflectometer.

21. The apparatus of claim 15, further comprising:

a calibration sample;

a calibration radiation source;

a first optical path supplying radiation from the calibration radiation source to the calibration sample for calibrating the first detector array, said directing means including a second radiation source and a second optical path.

22. An apparatus for measuring one or more films of a sample, comprising:

a reference sample;

means for directing a beam of radiation towards the reference sample, said reference sample being such that radiation from the beam modified by the reference sample includes at least one persistent wavelength marker;

means for determining a current pixel position of said marker:

means for correcting a pixel position-to-wavelength calibration of a detector array of multiple pixels by reference to the current pixel position and a prior pixel position of said marker at the detector array;

means for directing a beam of radiation towards the sample, said beam including broadband radiation, wherein the detector array of multiple pixels detects radiation from the beam that is modified by the sample; and means for providing a measurement of the one or more films at a plurality of wavelengths in the broadband simultaneously by reference to the corrected calibration.

23. The apparatus of claim 22, said reference sample having a persistent absorption or fluorescence peak or valley or interference pattern.

24. The apparatus of claim 22, wherein the detector array of multiple pixels detects radiation from the beam that is reflected by the sample.

25. The apparatus of claim 22, said apparatus being a spectroscopic ellipsometer or a spectroreflectometer.

* * * * *